2 Sheets--Sheet 1.

J. EDSON.
Steering Apparatus.

No. 147,754. Patented Feb. 24, 1874.

Witnesses:
George E. Phelps.
Horace M. Sproat.

Inventor:
Jacob Edson.
by Alvan Andrén, atty.

J. EDSON.
Steering Apparatus.

No. 147,754. Patented Feb. 24, 1874.

Witnesses.
George C. Phelps.
Horace M. Sproat.

Inventor.
Jacob Edson.
by Alban Andrén, atty.

UNITED STATES PATENT OFFICE

JACOB EDSON, OF BOSTON, MASSACHUSETTS.

IMPROVEMENT IN STEERING APPARATUS.

Specification forming part of Letters Patent No. 147,754, dated February 24, 1874; application filed September 12, 1873.

*To all whom it may concern:*

Be it known that I, JACOB EDSON, of Boston, in the county of Suffolk and State of Massachusetts, have invented certain new and useful Improvements in Steering Apparatus; and I do hereby declare the following to be a full, clear, and exact description of the invention, such as will enable others skilled in the art to which it pertains to make and use it, reference being had to the accompanying drawings, which form part of this specification.

My invention relates to improvements in steering apparatus for ships, consisting in the employment of a right-and-left-handed screw, arranged to operate the rudder on one side of the rudder-head, in connection with an oscillating rear bearing for the screw, so as to allow the screw-shaft to oscillate when the rudder-stock is turned on its axis. One of the nuts for the screw is made to swivel in a bearing on the rudder-head. The other nut for the screw is connected to the opposite side of the rudder-head by means of a suitable link, in the usual manner.

Figure 1:
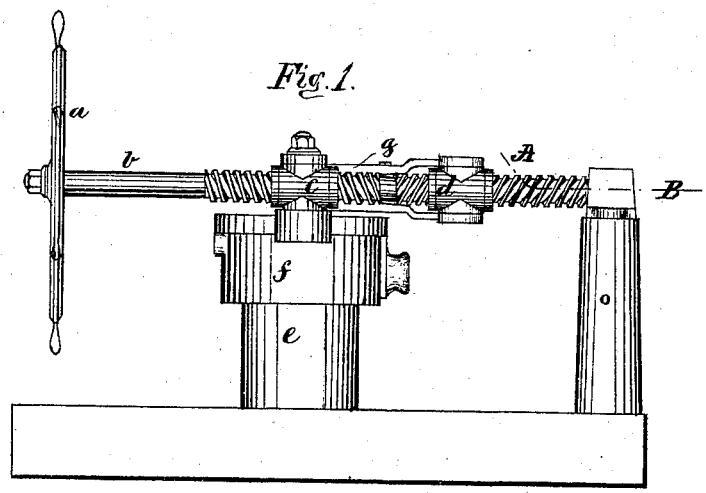
Figure 2:
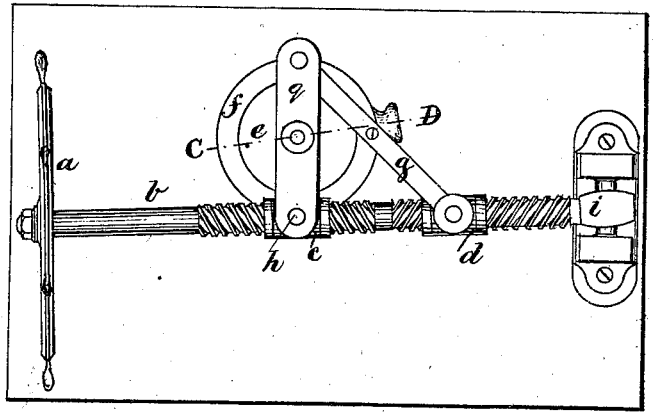
Figure 3:
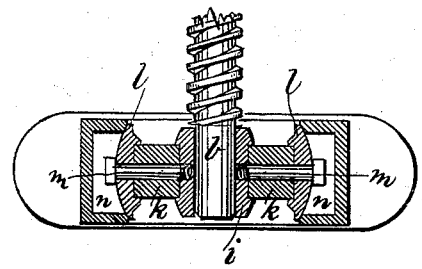
Figure 4:
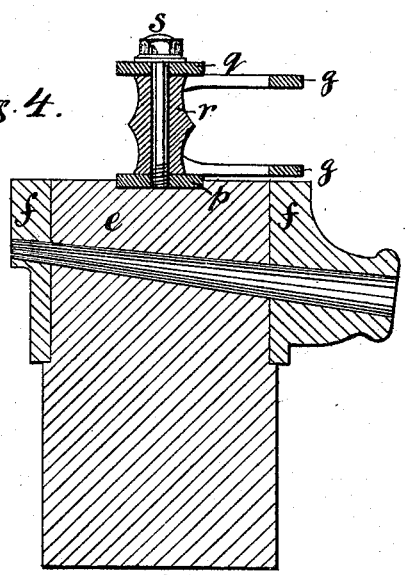

On the drawings, Figure 1 represents a side elevation of my improved steering apparatus. Fig. 2 represents a ground plan of the same. Fig. 3 represents an enlarged section on the line A B, shown in Fig. 1; and Fig. 4 represents an enlarged section on the line C D, shown in Fig. 2.

Similar letters refer to similar parts wherever they occur on the different parts of the drawings.

$a$, on Figs. 1 and 2, represents a hand-wheel, secured to the right-and-left-handed screw-shaft $b$ in the usual manner. The screw-shaft $b$ operates the two nuts $c$ and $d$, as shown. $e$ represents the rudder-stock, and $f$ represents the metallic rudder-head. The screw-shaft $b$, as well as the nuts $c\ d$, is located on one side of the rudder-stock, and not centrally over it, as has been the case heretofore. The object of this arrangement is to dispense with one set of links, and thus simplify the steering apparatus and increasing its strength, as it has less moving parts than other steering apparatus of a similar nature. The nut $c$ is pivoted directly to the rudder-head $f$, whereby I dispense with a link for said nut. The nut $d$ is connected to the opposite side of the rudder-head $f$ by means of a suitable link, $g$, as shown in Figs. 1 and 2. The nut $c$, when moved by the screw-shaft $b$, describes an arc of a circle equal to the distance between the centers of the rudder-stock $e$ and pivot $h$ for the nut $c$, and for this reason I am obliged to employ an oscillating rear bearing, $i$, for the screw-shaft $b$, as represented in Fig. 3. The bearing $i$ is provided on two opposite sides with recesses, in which are placed the elastic washers $k\ k$. Curved plates $l\ l$, provided with a recess on their inner side for the reception of the outer ends of the elastic washers $k\ k$, are connected to the bearing $i$ by means of screws $m\ m$ projecting through the curved plates $l\ l$, elastic washers $k\ k$, and screwed into the bearing $i$, as fully shown in Fig. 3. The curved plates $l\ l$ move in the stationary bearings $n\ n$, attached to the post $o$, Fig. 1. In this manner I obtain an elastic and oscillating bearing, $i$, for the rear end of the screw-shaft $b$, that allows the said screw-shaft to follow the circular motion of the rudder-head, and at the same time insures the shaft from the injurious action of heavy blows occasioned by the action of the waves on the rudder. The rudder-head $f$ has a bridge, $p$, cast in one piece with it—that is, let in in the upper end of the rudder-stock—by which arrangement the rudder-head is firmly secured to the rudder-stock, and prevented from turning around it; also, the rudder-head is prevented from bursting. The cross-bar $q$, that connects the pivot $h$ and the forward end of the link $g$, is secured to the bridge $p$ by means of the hollow post $r$ and screw-bolt $s$, as shown in Fig. 4.

Having thus fully described my invention, what I wish to secure by Letters Patent, and claim, is—

The combination of the rudder-head $f$, swivel-nut $c$, movable around a pivot, $h$, on the head $f$, and the screw-shaft $b$, arranged in an oscillating bearing, for the purpose as herein set forth.

In testimony that I claim the foregoing I have hereunto set my hand this 6th day of September, 1873.

JACOB EDSON.

Witnesses:
ALBAN ANDRÉN,
GEORGE E. PHELPS.